US012764491B2

(12) United States Patent
De Souza Ferraz et al.

(10) Patent No.: US 12,764,491 B2
(45) Date of Patent: Oct. 13, 2026

(54) SYSTEMS AND METHODS FOR VALIDATING INFORMATION ABOUT A USER BASED ON SENSOR INFORMATION OBTAINED FROM A USER DEVICE

(71) Applicant: Incognia Tecnologia da Informação Ltda., Recife (BR)

(72) Inventors: Andre De Souza Ferraz, Scotts Valley, CA (US); Lucas De Queiroz Lins Martins, Recife (BR); Alan Gomes Alvino, Recife (BR); Gabriel Avelar Falcone De Melo, Recife (BR); Filipe Martins De Melo, Recife (BR); Rafael Francisco Cavalcanti Campos Gouveia, Recife (BR)

(73) Assignee: Incognia Tecnologia da Informação Ltda., Recife (BR)

( * ) Notice: Subject to any disclaimer, the term of this patent is extended or adjusted under 35 U.S.C. 154(b) by 635 days.

(21) Appl. No.: 17/521,737

(22) Filed: Nov. 8, 2021

(65) Prior Publication Data

US 2022/0248168 A1 Aug. 4, 2022

Related U.S. Application Data

(60) Provisional application No. 63/144,280, filed on Feb. 1, 2021.

(51) Int. Cl.

*H04W 4/021* (2018.01)
*H04W 4/029* (2018.01)

(Continued)

(52) U.S. Cl.

CPC ........... *H04W 4/021* (2013.01); *H04W 4/029* (2018.02); *H04W 12/06* (2013.01); *H04W 12/63* (2021.01)

(58) Field of Classification Search

CPC ..... H04W 4/021; H04W 4/029; H04W 12/06; H04W 12/63; H04L 63/08

See application file for complete search history.

(56) References Cited

U.S. PATENT DOCUMENTS

2004/0128502 A1* 7/2004 Royer .................... G06F 21/32 713/156
2014/0004828 A1* 1/2014 Han ...................... H04W 64/00 455/411

(Continued)

FOREIGN PATENT DOCUMENTS

WO WO-2020/087110 A1 5/2020

OTHER PUBLICATIONS

International Search Report and the Written Opinion of the International Searching Authority mailed Mar. 25, 2022, for related PCT Application No. PCT/US2021/065140 filed Dec. 23, 2021, 8 pages.

(Continued)

*Primary Examiner* — Yuwen Pan
*Assistant Examiner* — Fatuma G Sherif
(74) *Attorney, Agent, or Firm* — Rothwell, Figg, Ernst & Manbeck, P.C.

(57) ABSTRACT

A computer system operates to obtain profile activity information from a user device, including a device identifier and a set of sensor data. From the device sensor data, the computer system determines at least one of (i) a location fingerprint for at least a given location from where the set of sensor data was obtained, and (ii) a location-based behavior that is specific to a user of the user device for the given location. The device identifier is stored in association with the determined location fingerprint or location behavior. The computer system further determines at least one of a current or recent location fingerprint or location-based behavior from a current or recent set of sensor data. A comparison is then made as between the current or recent location finger- (Continued)

print or location-based behavior and the location fingerprint or location-based behavior associated with the device identifier based on which outputs are generated.

18 Claims, 4 Drawing Sheets

(51) Int. Cl.
*H04W 12/06* (2021.01)
*H04W 12/63* (2021.01)

(56) References Cited

U.S. PATENT DOCUMENTS

| | | | | |
|---|---|---|---|---|
| 2014/0213299 | A1* | 7/2014 | Marti | G06F 3/048 455/456.3 |
| 2015/0094021 | A1 | 4/2015 | Su | |
| 2017/0323209 | A1 | 11/2017 | Rinzler | |
| 2018/0060546 | A1* | 3/2018 | Yin | H04W 12/06 |
| 2018/0141564 | A1* | 5/2018 | Ross | B60W 50/0098 |
| 2018/0249435 | A1* | 8/2018 | Yu | H04W 4/80 |
| 2018/0288060 | A1 | 10/2018 | Jackson | |
| 2018/0352376 | A1* | 12/2018 | Shuman | G06F 16/29 |
| 2019/0212823 | A1* | 7/2019 | Keller | G06F 3/0426 |
| 2020/0107163 | A1* | 4/2020 | Li | G06F 18/24137 |
| 2020/0349240 | A1 | 11/2020 | Yin | |
| 2020/0389452 | A1* | 12/2020 | Edwards | H04L 63/0861 |
| 2021/0027458 | A1 | 1/2021 | Chor | |

OTHER PUBLICATIONS

EESR in EP 21923571.0 dated Nov. 12, 2024.

* cited by examiner

SYSTEMS AND METHODS FOR VALIDATING INFORMATION ABOUT A USER BASED ON SENSOR INFORMATION OBTAINED FROM A USER DEVICE

RELATED APPLICATIONS

This application claims benefit of priority to Provisional U.S. Patent Application No. 63/144,280, filed Feb. 1, 2021; the aforementioned priority application being hereby incorporated by reference in its entirety.

TECHNICAL FIELD

Embodiments described relate to systems and methods for using non-identifiable sensor information to validate user information.

BACKGROUND

Increasingly, mobile devices are used as mechanisms that authenticate and/or validate users for a variety of applications where a high level of security is required. Typically, mobile devices are well-equipped with various types of sensors, such as cameras, microphones, fingerprint readers (or biometric scans), accelerometers, gyroscopes, satellite receivers, barometers, altimeters, light sensors and other types of sensors. The sensors are often used to add levels of security to the mobile device (e.g., user scans fingerprint to access device). For this reason, mobile devices can be used as trusted authentication mechanisms and facilitate maintaining a secure computing and communication environment when used with other services.

DETAILED DESCRIPTION

Figure 1:
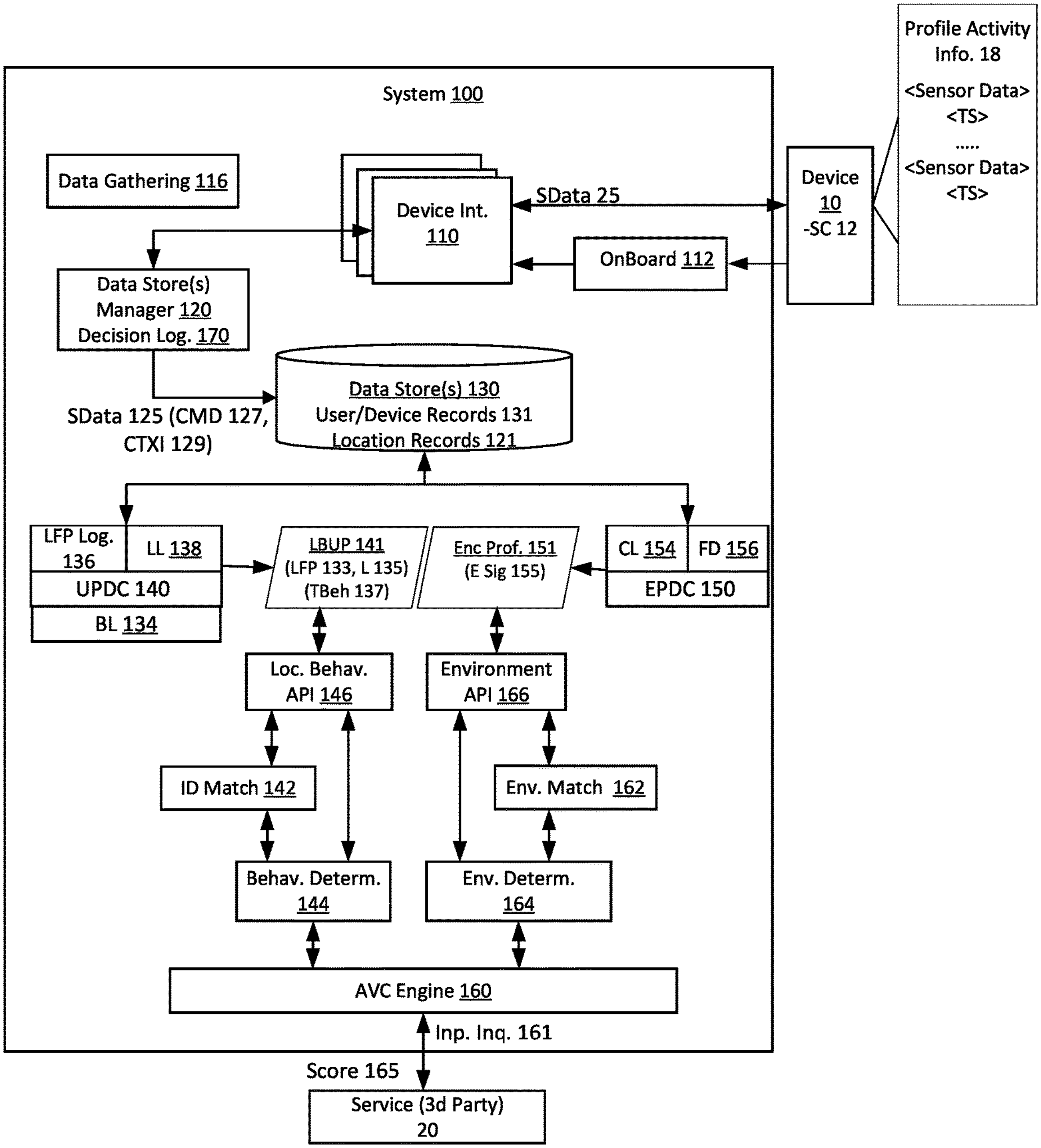
FIG. 1 illustrates a system to authenticate, validate or confirm information about users, according to one or more embodiments.

A location identifier refers to data that uniquely distinguishes a represented location from all other locations that are represented in a stored data store or system. In examples, location identifiers can be of different types, and multiple types of location identifiers can be associated with a given location. By way of example, a location identifier can correspond to a geographic or map coordinate (e.g., such as determined by a satellite receiver), a street address, a set of sensor values that are detectable by one or more sensors (e.g., wireless transceiver, altimeter, etc.) of a user device, a signature value determined from sensor values or other parameters associated with a location, and/or a calculated distance measurement in connection with a reference or other location that is known.

According to embodiments, a computer system operates to obtain profile activity information from a user device, where the profile activity information includes a device identifier that identifies the user device and a set of location-specific sensor data. From the set of sensor data, the computer system determines at least one of (i) a location fingerprint for at least a given location from where the set of sensor data was obtained, or (ii) a location-based behavior that is specific to a user of the user device for the given location. The computer system stores the device identifier in association with the location fingerprint and/or location-based behavior. The computer system communicates with the user device to receive current or recent profile activity information, including a current or recent set of sensor data, and determines the current or recent location fingerprint or location-based behavior from the current or recent set of sensor data. The computer system makes a comparison as between current or recent location fingerprint or location-based behavior and the location fingerprint or location-based behavior associated with the device identifier, and generates an output (e.g., matching score) that is based on the comparison.

Among other advantages, embodiments as described enable various applications in which user devices can authenticate, validate or confirm a user, while enabling information that is identifiable of a user of the user device to be shielded or masked (e.g., hashed). In this regard, embodiments as described can facilitate use of, for example, mobile devices, which otherwise communicate information that is an identifier of the user (e.g., user phone number or email address).

As used herein, a user device refers to devices corresponding to a mobile computing device, such as a cellular telephony-messaging device, wearable device, tablet device, smartphone, or Internet of Things (IoT) device.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, laptop computers, printers, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a system to authenticate, validate or confirm information about users, according to one or more embodiments. As described with examples, a network computer system 100 makes determinations about users using non-identifiable sensor data gathered from a user device. With respect to embodiments as described, the system 100 can be implemented on a server, on a combination of servers, and/or on a distributed set of computing devices which communicate over a network such as the Internet. Still further, some embodiments provide for the network computing system 100 to be distributed using one or more servers and/or mobile devices. Still further, in some embodiments, functionality as described with various examples can be implemented on user devices.

According to examples, the system 100 operates to receive and analyze sensor data 25 from computing devices of a population of users. In examples, a user can correspond to an individual that is associated with a user device 10 having a device identifier 11 (e.g., installation identifier). The user device 10 can communicate with the system 100 in different context: (i) during an onboarding process, where the system 100 registers the user; (ii) during data gathering processes, where the user device 10 transmits sensor data 25 to the system 100; and (iii) as a result of an event during which information about the user is to be authenticated, validated, or confirmed (collectively referred to as "checking", "checked" or variants).

User Device Configurations and Processes

In an example of FIG. 1, user device 10 is representative of devices utilized by other users of a population of users. As described in greater detail, in some examples, the user device 10 installs a software component 12 which executes background processes to (i) interface with one or more sensing components of the user device 10 to obtain sensor data 25, (ii) and transmit the sensor data 25 to the system 100. In variations, the component 12 maintains a history of the collected sensor data 25. Still further, the component 12 can include processes to process (e.g., normalize), analyze and/or augment the sensor data 25 on the user device 10.

In examples, the software component 12 is downloaded by the user as part of a third-party application. For example, the software component 12 can be implemented as a component of a financial service application which is linked or otherwise associated with a financial instrument (e.g., credit card, debit card) of the user. In such applications, the user can use the financial instrument to make a purchase, and the system 100 can use information provided by the software component 12 to authenticate the user (e.g., the user is the person using the financial information). As additional examples, the software component 12 can be implemented as part of an application provided functionality that includes: (i) a payment service or e-wallet application function which the user can utilize at a merchant location to make a payment, (ii) a security function that can confirm a location of a user, or authenticate the user's presence at a particular location; and/or (iii) a bot detection function that can detect whether sensor data purportedly transmitted from a user device 10 is in actuality transmitted from an emulation or 'fake' device (e.g., as part of a fraudulent scheme), rather than from a device used by an actual person (i.e., 'proof of human user'). In examples, the software component 12 is executed on the user device 10 as one or more background processes that interface with sensors and sensing components of the user device. As described, the software component 12 can interface with, for example, wireless components of the user device 10 (e.g., Wi-Fi, Bluetooth or cellular transceivers and interfaces), motion sensors (e.g., accelerometer, gyroscope), environmental sensors (e.g., magnetometer, altimeter, thermometer, barometer, wind speed detector, ambient light sensors, etc.), a microphone, and/or image capture component of the user device 10. In this way, the user device 10 operates to collect sensor data that is characteristic of respective locations where the user device 10 is located at one or more time intervals. However, in some embodiments, the sensor data 25 excludes information of a type considered as personal identifiable information (e.g., legal name, email identifier, messaging identifier, or other types of information, such as may be defined in privacy protection laws and policies of governments).

In an embodiment, the component 12 operates on the user device 10 to cause the user device 10 to sample sensor data from one or more local wireless receivers of the user device 10. In examples, sensor data 25 can be sampled from a local wireless receiver of device 10 and include (i) SSID and/or other identifying information of wireless networks that are detectable to the user device 10, and (i) signal strength data of individual local (e.g., Bluetooth, Wi-Fi, etc.) or cellular wireless networks. Still further, the component 12 can operate on the user device 10 to obtain sensor data 25 that includes data sampled from motion sensors (e.g., accelerometer, gyroscope), environmental sensors (e.g., magnetometer, altimeter, thermometer, barometer, wind speed detector, ambient light sensors, etc.), a microphone, and/or image capture component of the user device 10.

Further, the component 12 can include processes that execute on the user device 10 to transmit the gathered sensor data 25. The software component 12 can include processes that cause the user device 10 to transmit the sensor data 25 to the device interface 110, which can include a programmatic interface to exchange communications with the user device 10. In some variations, the component 12 processes the sensor data 25 before transmitting the sensor data 25 to the system 100. For example, the component 12 can include processes to normalize the sensor data 25 before the sensor data 25 is transmitted to the system 100. In some implementations, the normalization process can, for example, account for device-specific variations as to the external signal (e.g., local wireless network signal) being measured by the user device 10. The normalization process can account for variations that are specific to, for example, the model of the user device 10, the type of device 10, and/or device-specific variations.

The user device 10 can maintain a historical data set of the sensor data 25, which can include information obtained from prior or current time intervals. For example, the component 12 can execute on the user device 10 to cause the user device 10 to collect a historical data set, and further to transmit the historical data set to the system 100 as a response to a request (e.g., from network the system 100), predefined event or in accordance with a schedule. In variations, the user device 10 can augment the collected sensor data 25 with contextual information obtained from one or more sources of the user device 10. The contextual information can include a time when a particular set of sensor data 25 was recorded and/or application events or information which are deemed to be indicative of relevant context (e.g., device alarm clock application alert, calendar alert, etc.). In implementations, the background processes can execute on the user device 10 to obtain the sensor data 25 based on a schedule, events detected from local sources (e.g., application events), logic-based decisions to collect the sensor data 25 and/or external events or triggers (e.g., such as may be communicated through the device interface 110, as described with examples provided below). The system 100 can also collect different types of sensor data 25 at different times, frequency and/or responsive to different types of events.

The timing of when the user device 10 transmits the sensor data 25 to the device interface 110 can also vary based on implementation. The user device 10 can, for example, transmit a particular set of sensor data 25 to the system 100 as a response to a request communicated by the device interface 110. In other implementations, the user device 10 transmits sensor data 25 to the system 100 in accordance with a schedule, or as a response to a local or external event.

In examples, the transmission from the user device 10 to the device interface 110 can include sensor data 25 and a device identifier. The data store manager 120 can operate to hash the device identifier and use the resulting hashed value to locate the corresponding user record 131. In some examples, the transmitted sensor data 25 may also be hashed (shown by hashed sensor data 125) and stored with the user record 131 in the data store 130.

Onboarding

The component 12 can also execute to implement an onboarding process, where an initial data set is obtained for a user of the device. In implementing the onboarding process, the component 12 executes to communicate onboarding information to an onboarding component 112 of the system 100. The onboarding information can include, for example, one or more user or device identifiers that identify or otherwise correlate to a user or device. The onboarding component 112 can communicate with data store manager 120 to generate a user record 131, with the hashed form of the user's device identifier providing a key or locator to the record. In examples, the hashing scheme utilizes a persistent hashing function that hashes information subsequently obtained from the user device, and further utilizes the persistent hashing scheme to hash and store the obtained device information with the corresponding user record 131. As an addition or variation, a hashed form of other types of user information (e.g., userID, user address) can be used as a locator for the respective user record 131.

Location-Specific User Profile

According to examples, user profile determination 140 implements processes to determine and update a unique location-specific user profile 141 for the user associated with the user device 10. As described with some examples, the location-specific user profile 141 can generate data representations from non-personal identifiable information generated by the user device 10, where the generated data representations are uniquely specific to and/or characteristic of (i) relevant locations for a user, and (ii) location-based behavior of the user.

The location-specific user profile 141 can be generated and updated over time so that the data set representations are current and accurate. In examples, the location-specific user profile 141 can be generated as a data set that is integrated with the data store system 130. In examples, the location-specific user profile 141 can associate a hashed device identifier of user device 10 with (i) multiple sets of sensor data 125, where each set of sensor data 125 is indicative of a location that is relevant to the user, (ii) one or more location fingerprints 133 that are derived using the associated sensor data 125, where each location fingerprint 133 is uniquely characteristic of a corresponding location of relevance to the user of user device 10, and (iii) one or more labels 135 for each location fingerprint 133, where each label 135 indicates a function or role of the represented location to the user.

As further described, in some examples, the sensor data 125 can include or be based on data captured by multiple sensors or sensing components of user device 10, including sensor data captured by movements sensors and/or environmental sensors of user device 10. Still further, the multiple sets of sensor data 125 can include contextual metadata 127, reflecting additional information generated by the respective sensor or sensing component, the user device 10, or other sensors and sensing component of the user device 10. By way of example, contextual metadata can include timing information (e.g., time stamps) when particular types of sensor data 25 was captured on 10, where the timestamps or generated by the respective sensor, sensing component, network component or device clock. The contextual metadata 127 can include timing information of captured sensor data, such as a timestamp generated by a respective sensing component or clock of user device 10.

Still further, in examples, the location-specific user profile 141 includes contextual information 129 that generated by, for example, application-generated events, including third-party applications (e.g., alarm clock alarms, calendar appointments, fitness application, etc.). As an addition or variation, contextual metadata can include data captured from other sensors and sensing components of the user device 10, such as (i) data captured by movement sensors of the user device 10 during a time interval in which wireless sensing data is also captured, and (ii) data generated by environmental sensors.

Location Fingerprints

In examples, user profile determination 140 processes the (hashed) sensor data 125 originating from the user device 10 to determine one or more location fingerprints 133 that are uniquely characteristic to a relevant location for a user of computing device 10. Each location fingerprint 133 can correspond to a data set representation that is characteristic of a distinct location, using data determined from the user device 10. In this way, each location fingerprint 133 can represent a relevant location of the user (e.g., home of user).

Still further, in some examples, the user's relevant locations can include locations that are authorized for the user. For example, a user's home or work locations can be locations that are authorized for the user, meaning the user is able to authenticate himself in connection with using his or her user device to access a service or resource.

In examples, the fingerprint logic 136 uses hashed sensor data 125 that is based on sensor data 25 collected from local wireless components (e.g., transceivers and modules) on the user device 10 to determine the location fingerprints 133 of the user. Accordingly, the sensor data 125 can be based on (i) SSID and/or other identifying information of wireless networks that are detectable to the user device 10, and (i) signal strength data of individual local (E.g., Bluetooth, Wi-Fi, etc.) or cellular networks that are detected by the user device 10. As an addition or variation, the sensor data 125 can include data sampled from motion sensors (e.g., accelerometer, gyroscope), environmental sensors (e.g., magnetometer, altimeter, thermometer, barometer, wind speed detector, ambient light sensors, etc.), a microphone, and/or image capture component of the user device 10. In some examples, each location fingerprint 133 can be in the form of a vectorized data structure that is based on an underlying set of sensor data 25 collected from the user device 10.

The user profile determination 140 can implement the fingerprint logic 136 to aggregate such sensor sets at repeated instances over a given time interval, and further to cluster such data sets into nodes that are identified based at least in part on a similarity amongst individual data sets. The aggregated sensor data can further be processed to generate, for example, a vectorized data representation of each detected node.

Labelling

User profile determination 140 can implement labeling logic 138 to determine labels for location fingerprints 133 which are deemed to represent locations of relevance for a given user. In examples, the labeling logic 138 identifies a user's home location. As an addition or alternative, the labeling logic 138 can be used to identify a work location, or a frequently visited location of the user.

In some examples, the labelling logic 138 determines the home location for the given user by making one or multiple determinations based on aggregations of sensor data 125 collected from the user device 10. In some examples, the labelling logic 138 can identify the home location using rules, weights and other logic to multiple determinations made from the aggregation of sensor data 125, in order to select one of multiple relevant locations (as represented by respective location fingerprints 133) as being the home location. By way of example, the labelling logic 138 can identify the location fingerprint 133 representing the location which (i) the user most-frequented traveled to, (ii) the user is located at a particular time (e.g., 3:00 am, for one or multiple days), and/or (iii) the user spent the most time at.

As an addition or variation, the labelling logic 138 can identify the location fingerprint 133 associated with a particular context (e.g., home), such as by movement sensors and/or contextual information generated by third-party applications that operate on the user device 10. For example, the output of movement sensors on the user device 10 can be processed to determine the first instance during a day where the user device 10 is moved, because the first movement of user device 10 can correspond to a movement the user performs upon waking up (e.g., presumably the user awakens at his home). Likewise, a software generated alarm event by a third-party application (e.g., alarm clock) can identify the moment when a user wakens, and the location fingerprint 133 representing the location of the user at the time when the alarm was generated can further weight the represented location as being deemed the home location (e.g., presumably the user awakens at his home).

In some examples, the user profile determination 140 implements the labelling logic 138 to identify the relevant locations for a user as being those locations which the user most-frequently visited and/or spent the most time at, with the home location being the one which the user most frequently traveled to and/or stayed at. For example, labeling logic 138 can generate a histogram of locations (as represented by multiple location fingerprints 133) that identify frequency of the user's visit, and/or duration of the user's presence at that particular location. User profile determination 140 can include location labelling logic 138 to label each location that is identified by a respective location fingerprint 133 to use one or more types of sensor data 125 to identify a fingerprint data set that represents a location of relevance to the user (e.g., user's home).

In examples, the user profile determination 140 generates a set of labels 135 for the location-specific user profile 141, with each label 135 being associated with at least one location fingerprint 133 of a given user's record. Depending on implementation, the labels 135 can include one or more of (i) a designation of the user's home, (ii) a designation of a relevant or highly visited location of the user, other than the user's home, (iii) more informative labels such as "work", and/or (iv) labels which utilize information obtained from other sources and/or from sensor data of other users (e.g., home, work, gym, store, restaurant, etc.).

Trusted Behavior

In examples, the user profile determination 140 includes behavioral logic 134 to analyze other sensor data 125, contextual metadata 127 and/or contextual information 129 generated from the user device 10, to determine location-based behavior(s) that is characteristic to the user ("trusted behavior 137") at a particular location. In an embodiment, the behavioral logic 134 analyzes sensor data 125 generated from movement sensors of user device 10. An output of the movement sensors can reflect, for example, an amount, frequency, magnitude or type of movement which the user makes with the user device 10. As an addition or variation, the behavioral logic 134 can determine a type of activity that the user performs based on the sensor data 125. For example, the behavioral logic 134 can determine a type of activity the user performs based on sensor data generated from movement sensors of the user device 10.

In variations, the user device 10 can include logic for determining a type of activity which the user is performing. This type of contextual information 129 can be communicated to the system 100, along with, for example, raw sensor data from which the behavioral characterizations were made.

As an addition or variation, the behavioral logic 134 can analyze the sensor data set 125 in context of timing information and/or other events, to define data sets that represent the trusted behavior 137 of the user. For example, an output of the movement sensors can be analyzed using contextual metadata 127 (e.g., at a particular time), and/or in a context identified by contextual information 129 (e.g., as a response to a particular event, such as an alarm clock alert). The select sensor data 125 can reflect parameters such as a time and/or duration when the user device 10 was moved at the particular location associated with the user, and/or a type, magnitude, duration of the movement (e.g., movement along Z-axis, pitch, yaw, etc.). The select sensor data 125 can be combined or integrated with the data representation of the trusted behavior 137. Further, the data set that defines the trusted behavior 137 can be linked to a particular location, such as the home location of the user.

In some embodiments, contextual information 129 obtained or determined on the user device 10 can also be used to determine contextual events that are determinative, or indicative, of a trusted behavior of the user. For example, in the case where the contextual information includes a third-party application event (e.g., alarm clock application issues alert), the contextual information can identify a time when the alarm clock alert occurred, which may be characteristic of the user based on a propensity of the user to set the alarm clock at the particular time. Other behaviors, such as whether or not the user "snoozes" as well as the duration until the user moves the user device 10 can also provide characteristic contextual information 129 with regards to the user. In examples, select contextual information 129 can be parameterized to reflect information such as the alarm generated from the user device 10, the application used to generate the alarm, settings of the alarm, and/or the user response to the alarm (e.g., user hits snooze once or twice). Additionally, the contextual information 129 can be vectorized, or otherwise combined or integrated with other information provided with the data set that defines the trusted behavior 137 of the user.

Location-Based User Identifiers

In examples, user profile determination 140 implements processes to determine additional location-based identifiers for the user of user device 10. As described with examples, an embodiment can provide for the location fingerprint 133 that represents the user's home location to be a first type of location-based identifier of the user. In variations, the location fingerprints 133 of each relevant location, or alternatively, relevant locations of the user which satisfy one or more criteria, can serve as another type of identifier for the user of user device 10. In such examples, the criterion/criteria for utilizing a relevant location as a user identifier can correspond to one or more of (i) a threshold frequency of presence by user computing device 10, (ii) a threshold duration of presence of user device 10 over a given time interval, or (iii) a presence of user device 10 over a defined time interval (e.g., business hours of a day).

Still further, timing information associated with the location fingerprints 133 of the relevant locations can be used to determine a characteristic location pattern for a user. A characteristic location pattern can include, for example, (i) locations where a user is likely to be present over a particular duration (e.g., 12- or 24-hour period), (ii) a sequence amongst multiple relevant locations, reflecting an order of travel for the user during a given time interval (e.g., user drives from home to work, work to gym, gym to home).

As an addition or alternative, the location-based identifiers for the user of user device 10 can include trusted behaviors 137, such as may be determined from the sensor data set 125 and contextual information 129 provided by the user device 10.

Still further, in some examples, one or more relevant locations of the user can include or correspond to environments. As described with examples provided below, the user profile determination 140 can identify a relevant location of a user as a trusted environment for the user—meaning the relevant location of the user matches an environment signature 155 (as described below) of a given environment. Thus, as further described, the user profile determination 140 can utilize multisensory data sets 125 from other users in determining that a particular environment is a trusted environment.

Still further, in some examples, contextual information 129 can include information that identifies a distance or duration of travel (e.g., walking, in vehicle, through public transit) as between a trusted relevant location associated with the user (e.g., the user's home), and a second location where the user's presence is to be validated (e.g., bank). The distance or duration of travel from the trusted location of the user to the location where the user is to be validated can serve as a separate marker that confirms or validates the presence of the user at the second location. The distance or duration of travel can be determined from, for example, timestamps, satellite receiver of user device and/or other sensor information.

Environment Profiles

According to some embodiments, the system 100 includes an environment profile determination component 150 that generates environment profiles 151 for environments where multiple user devices 10 are detected as being present over the course of a given time interval. In examples, an environment can reflect an area (e.g., shopping mall, building, park, etc.) having one or multiple nodes, where each node represents a location where at least one user in a population of users is detected as being present. As described, the environment profiles 151 can be based on sensor data 125 that is obtained from multiple user devices 10.

In embodiments, the environment profile determination component 150 aggregates the sensor data set 125 of multiple users for a given environment. The aggregated sensor data 125 is clustered to identify sensor data sets generated by multiple users which are sufficiently similar, based on, for example, a predefined threshold. The sensor data sets can include multisensory data sets from individual user devices 10, such as a combination of sensory data that represents at least two of ambient noise, temperature, altitude, air pressure, ambient light and/or earth's magnetic field. In variations, the multisensory data sets can include wireless sensing data.

In examples, the environment profile determination component 150 further processes the clustered data sets to determine an environment signature 155 for each clustered data set. The signature data set can, for example, include a vectorized representation of select types of sensor data, collected from multiple devices 10 of the aggregation. The signature data set 155 can provide a characteristic identification for an environment. For example, in the case where an environment corresponds to a store, the environment signature 155 can provide an identifier that is specific to the store, or to a region within the store.

In some examples, the environment profile determination component 150 includes an environment classifier 154 which determines a set of attributes for a given environment. In examples, the attributes determined by the environment classifier 154 can determine attributes reflecting a flow of users through individual environments. The environment classifier 154 can analyze aggregations of sensor data 125 from multiple users repeatedly, over different time intervals (e.g., every ¼, ½, 1, 2, 4, 8, 12 or 24 hours, every business day hours, etc.). During each time interval, the environment classifier 154 can identify the user devices 10 which are present in a given environment by, for example, determining those user devices 10 for which the sensor data reflects a match to the environment signature 155. Over successive intervals, the environment classifier 154 determines inflow and outflow of users through the environment. In this way, the environment classifier 154 determines attribute(s) that reflect an overall flow of user devices 10 that enter the environment (incoming flow), are present in the environment, and exit the environment (outgoing flow).

In some examples, the environment classifier 154 can further associate tags with environments, where the tags are identified by user or operator input, by positioning sensors (e.g., GPS on user devices), and/or by mapping services. The tags can, for example, identify an environment by a business type, business name, landmark or other human-understandable identifier.

Still further, the environment profile determination component 150 can include a flow determination 156 that performs similar user presence and flow analysis on multiple environments (e.g., stores and restaurants in a given area). In some examples, the flow determination 156 determines the flow of a population of users through multiple environments, where each flow can reflect a certain number of users that traveled (e.g., walked) from one environment to another. Collectively, the flows can identify the propensity of individual users of the population to travel from one environment to another environment. In this way, the environment profile determination component 150 can determine (i) one or more likely next stops for individual users based on the propensity of the population, and/or (ii) one or more paths of travel for individual users, reflecting a propensity of the population to follow those same paths.

Figure 3:
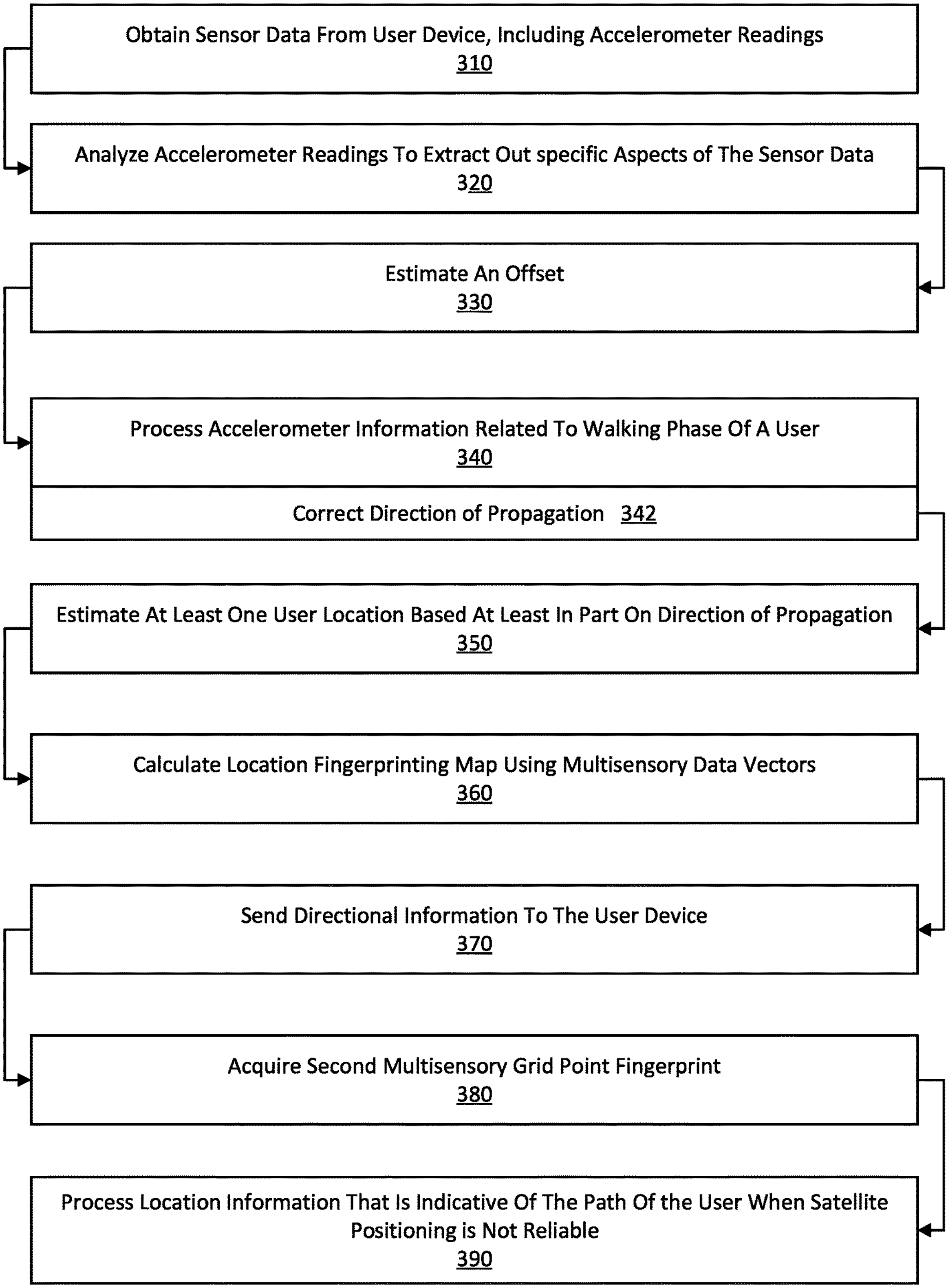
FIG. 3 illustrates a method for approximating a position of a user device using multisensory data sets, according to one or more embodiments.

In some examples, the flow determination component 156 can also generate and maintain a map that identifies environmental signatures 155 of location nodes, corresponding to estimated locations where satellite receiver data may be inaccurate or not available. An example of FIG. 3 illustrates a map of locations generated through use of environmental signatures.

Location and Behavior Analysis and Determinations

According to examples, the system 100 includes service components that provide services for authenticating the user, validating information provided by the user and/or confirming information about the user. In some examples, the system 100 includes an AVC engine 160, a match identifier component 142, a behavior determination component 144, and an application programming interface (API 146). The API 146 can implement one or more processes for retrieving data sets from the data store 130 and/or from the user device 10, as well as to trigger processes and logic (e.g., location fingerprint 132) for structuring retrieved data. The AVC engine 160 can operate to receive an input inquiry from a third-party service 20, and to communicate an output that reflects a determination of the match identifier component 142 and/or the behavior determination component 144.

As described with examples, the third-party service 20 can correspond to (i) a financial service that authorizes financial transactions using a financial instrument of the user, (ii) an account authorization service that authorizes a user in opening a new account, or (iii) an entity that is requesting for validation of a user's location or provided information.

Match Identifier

The match identifier component 142 can perform operations to obtain a recent or current set of sensor data 125 from the user device 10, either directly or via the data store 130, based on input inquiry communicated from, for example third-party service 20. In some implementations, the match identifier component 142 triggers, via the API 146, the fingerprint logic 136 to convert the obtained set of sensor data into a location fingerprint (e.g., vector representation). The match identifier component 142 can also obtain one or more location-based identifiers from a record 131 that is to be matched to the input inquiry. The match identifier component 142 compares the location fingerprints 133 from recent or current sensor data sets 125 with the location identifiers associated with the record 131 to generate a match identifier score 165 (or matching score) for the AVC engine 160. The matched identifier score 165 can reflect a probability or other determination that the location fingerprints 133 generated for the recent or current set of sensor data match location-based identifiers of the compared record 131. In this regard, the score can reflect a level of risk (e.g., risk score) that the user is, for example, an imposter. In this way, the matched identifier score 165 can reflect a probability that the owner/operator of user device 10 was present in one or more locations associated with an underlying user record 131 associated with the user device 10. The AVC engine 160 can then transmit the matched identifier score 165 to, for example, the third-party device.

According to some examples, the AVC engine 160 can receive the authentication inquiry from a third-party service 20, where the authentication inquiry seeks confirmation that a person taking action as a user of user device 10 is genuine. The inquiry may include or otherwise identify a device identifier for a corresponding user device 10. The match identifier 142 can respond to the inquiry by retrieving, from the data store 130 via the API 146, a location-specific user profile 141 associated with the user device 10. The API 146 can, for example, use the persistent hashing scheme to identify a user record 131 that matches to the hashed form of the device identifier, from which the location-specific user profile 141 can be retrieved.

In some implementations, the match identifier 142 utilizes the API processes 146 to trigger the device interface 110 to retrieve a recent or current set of sensor data 25 from the user device 10. The recent or current set of sensor data 25 can be subjected to the persistent hashing scheme and provided to the match identifier component 142. In variations, the data store 130 may be up to date, meaning it includes recent or current sensor data 125 of user device 10, and the match identifier 142 uses the API 146 to retrieve the recent or current data set from the data store 130. The match identifier 142 can compare the recent or current sensor data set with the location-based user identifiers of the record 131 associated with the user device 10.

In an embodiment, fingerprint logic 136 determines location fingerprints 133 for recently collected sensor data set of user device 10. The match identifier 142 implements compares the location fingerprints 133 of the recently collected sensor data set with the location based user-identifiers of the location-specific user profile 141. The comparison enables the match identifier component 142 to generate a score (e.g., likelihood) or other determination as to whether sensor data 125 collected from a current or recent time interval matches with historical sensor information collected from the user device 10 (e.g., such as represented by the location-based user profile 140).

In some examples, the match identifier 142 can make a determination as to a degree of similarity between the respective location fingerprints 133. The match identifier 142 can implement a matching process in which a user is authenticated when a degree of similarity between the compared location fingerprints 133 satisfies a threshold value. The match identifier 142 may further generate a score 165 that indicates the respective location fingerprints 133 match. In variations, the score 165 can also indicate a degree to which the location fingerprints 133 match. In this way, when the score 165 determines that a match exists, it reflects a determination that the user device 10 that is with the user has a home location of the user being authenticated. As mentioned in other examples, the determination can be made without use of personal identifiable information, such as GPS coordinates (or longitude and latitude) and/or other personal identifiable information of the user (e.g., email address, User ID, etc.). The AVC engine 160 can communicate the score 165 to the requesting service 20.

Trusted Location Behavior Classification

The behavior determination component 144 can perform operations to obtain a recent or current set of sensor data 125, including contextual metadata 127 and contextual information 129, from a user device 10, either directly or via the data store 130. The behavior determination component 144 can utilize the API 146 to implement operations to structure or format the obtained data in accordance with the structure or format of the trusted behavior data sets 137 of the data store 130. In some examples, the behavior determination component 144 can select or otherwise determine a behavior data set 137 associated with a trusted location of a respective user record 131 of the user device 10. In response to an input inquiry from the AVC engine 160, the behavior determination component 144 can determine a classification of the trusted location behavior.

In some examples, the behavior determination component 144 can operate to make a remote health check on an owner of user device 10, without use of personal identifiable information of the person being checked. The remote health check can correspond to a determination that the obtained data set matches a behavior data set 137 associated with a trusted location of a respective user device 10. In some examples, the behavior data set 137 selected for the check is of a particular type (e.g., sensor data from movement sensors), so as to indicate a threshold level of activity by the owner of the user device 10. In some examples, a particular type of health check can correspond to a proof-of-life human user check, where the behavior determination component 144 confirms that the user device 10 is not a bot (e.g., emulation of 'fake' device), but rather a device that is being used by a human user. The determination can be based on an activity level or type detected from the user device 10 at the trusted location of the user.

Environment Matching

In embodiments, the system 100 includes an environment matching component 162, a trusted environment determination component 164, and an application programming interface (API 166). The API 166 can implement one or more processes for retrieving data sets from the data store 130 and/or from the user device 10, as well as to trigger processes and logic for structuring retrieved data to reflect signatures 155. The AVC engine 160 can operate to receive an input inquiry from a third-party service 20, and to communicate an output that reflects a determination of environment matching component 162 and/or the trusted environment determination component 164.

In some examples, environment matching component 162 can respond to an input inquiry 161 from the AVC engine 160 by retrieving, via the API 166, a current or recent set of sensor data from the data store 130 or from the user device 10. Environment matching component 162 can trigger logic used with the environment profile determination component 150 to determine an environmental signature 155 of the user device 10 during a recent or current time interval. Environment matching component 162 can match the environment signature 155 of the current or recent data set to the environmental signature stored with one or more location records 121 to determine an environment of the user device 10 during the recent or current time interval. In this way, environment matching component 162 can determine an environment where the user device 10 is present.

In some examples, the trusted environment determination component 164 can identify trusted environments of users, reflecting or corresponding to trusted locations of individual users. The trusted environment can reflect, for example, an environment that includes a location that is trusted or relevant for the user.

In response to an input inquiry 161, environment matching component 162 and/or trusted environment determination component 164 can retrieve current sensor data from the user device 10, and use the current sensor data to determine whether the user of user device 10 is present in a given environment (e.g., location of merchant, place associated with optical code of product, etc.). Still further, the AVC engine 160 can trigger the behavior determination component 144 to confirm that the trusted behavior 137 determined from the user 10 matches a trusted behavior of the user. The determination of the trusted behavior 137 at a particular environment can, for example, be used to classify the environment or confirm the presence of the user at the environment.

Decision Logic for Sensor Data Gathering

According to examples, the system 100 implements processes to optimize the use of sensors and resources of user device 10 to preserve battery power. In particular, embodiments recognize that gathering and utilizing sensor data sets from multiple sensors of the user device 10 at one time (e.g., wireless sensing data, movement data, environmental data) can be beneficial to the determination of information such as location-based identifiers, trusted activities, trusted environments and other determinations as described in this application. As shown by an example of FIG. 1, sensor gathering logic 170 can interface with the data store system 130 to determine current and historical sensor data 125 of the individual users. In examples, the decision logic 170 can reside on the network computer system and compute with the user device 10 via the device interface 110. In variations, the decision logic 170 is distributed between the system 100 and the user device 10. For example, the decision logic 170 can determine a set of rules or conditions under which the user device 10 is to collect and transmit sensor data. The decision logic 170 can communicate, and cause the user device 10 to implement logic to cause the device to perform operations for detecting the condition(s) and/or implementing rules.

In some examples, system 100 develops location-specific profiles 141 for users, based on sensor data (e.g., wireless sensing data) that are sampled at times when the user is anticipated to be home or at a relevant location. Accordingly, location-specific profiles 141 can be associated with location-specific sensor data. In examples, the behavior logic 134 can determine an activity profile of the user using sensor data (e.g., movement sensors), contextual metadata 127 and contextual information 129. From the behavioral activity, the profile determination component 140 can generate the location-specific profiles 141 to associate a home or relevant location (as represented by a corresponding location fingerprint 133) with a time or time interval. The decision logic 170 can use the location-specific profiles 141 to determine a schedule under which the user device 10 is to gather and transmit (or more frequently gather and transmit) sensor data 25 to the system 100. For example, if the location-specific profiles 141 indicates the user is likely to be in one location at a particular time (e.g., user remains home between certain hours, or is at work during other hours), the decision logic 170 minimizes the frequency or count under which the sensor data 25 is gathered and transmitted.

Still further, in examples, the behavior logic 134 can process the sensor data 125 to determine the trusted behavior 137 while, or responsively to when a user is performing a particular activity. Further, the behavior logic 134 can determine or otherwise characterize the activity being performed as it is performed. When the user is performing an activity, the decision logic 170 makes a determination as to when the data gathering should be implemented on the user device 10. The timing of the data gathering may be based in part on the type of activity that is performed.

In examples, the decision logic 170 can generate timing information for the user device 10, where the timing information can identify a schedule under which a full set of sensor data is to be obtained on the user device 10 and transmitted to the system 100. The decision logic 170 can, for example, generate the timing information that is stored at a cloud location, and the user device 10 can retrieve the schedule from the location at set intervals.

In examples, the system 100 can be used to determine a user's next location. For example, the flow determination 156 can determine a next location of a user, based on their current location and prior flow paths for the user or population of users. The decision logic 170 can determine a timing for when the user device 10 should gather sensor data based on, for example, a predictive determination as to a next location of the user, as well as a determination of the user's current location.

Methodology

Figure 2A:
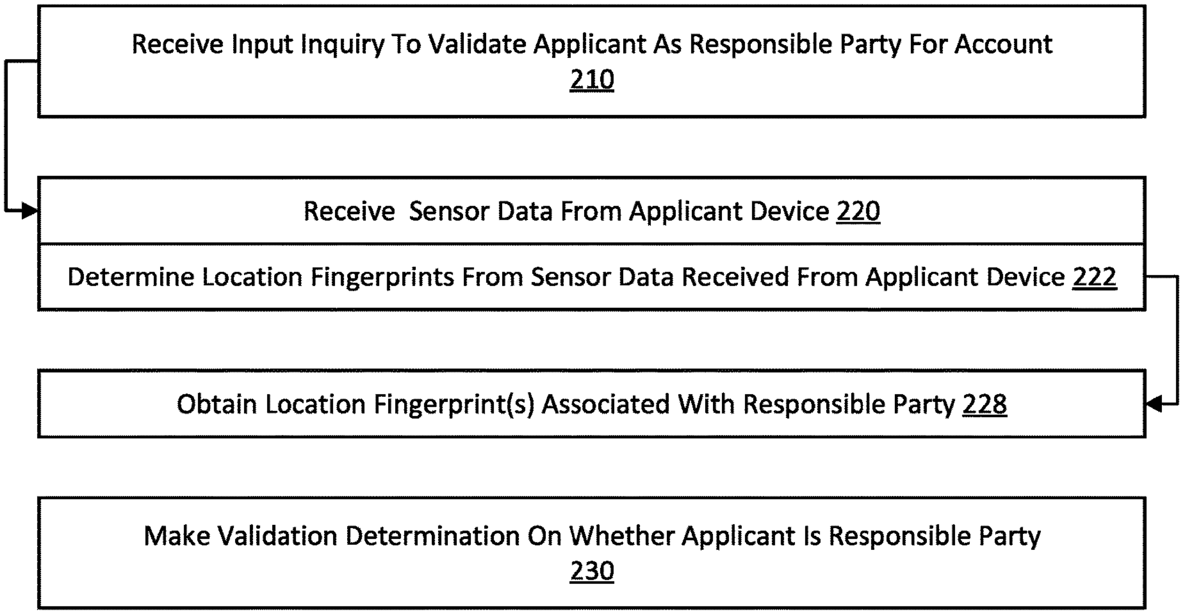
FIG. 2A illustrates a method for validating a respective type of user account activity based on non-personal identifiable information obtained from a user device, according to one or more examples.
Figure 2B:
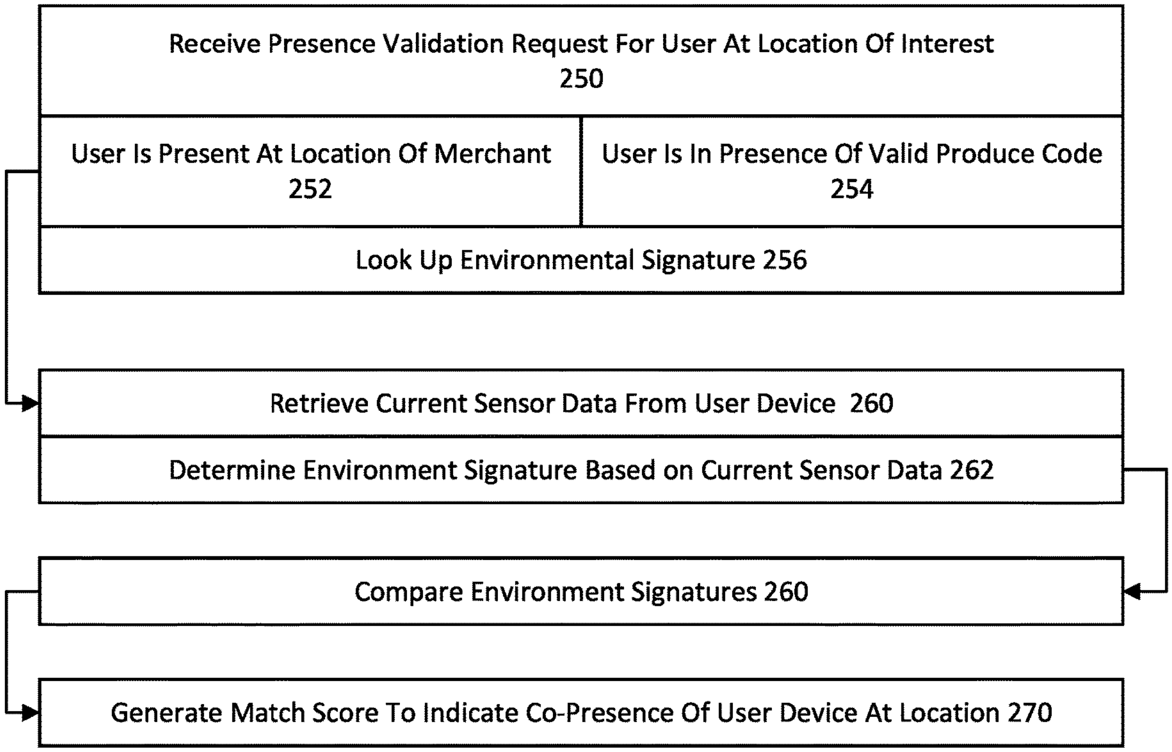
FIG. 2B illustrates a method for validating a transaction or activity of a user at a location of the transaction, according to one or more examples.

FIG. 2A illustrates a method for validating a respective type of user account activity based on non-personal identifiable information obtained from a user device, according to one or more examples. FIG. 2B illustrates a method for validating a transaction or activity of a user at a location of the transaction, according to one or more examples. Methods such as described with FIG. 2A and FIG. 2B may be implemented using components such as described with examples of FIG. 1. Accordingly, reference is made to elements of FIG. 1 for purpose of illustrating suitable components for performing a step or sub-step being described.

With reference to FIG. 2A, the AVC engine 160 receives an input inquiry 161 to validate an applicant as a responsible party for an account (210). For example, an application for a new account can identify an account holder, including a home address or billing address of the account holder. In such context, examples, recognize that bad actors can attempt to open or otherwise use accounts by supplying information for a responsible party (e.g., a party being defrauded).

As described in examples, information is provided by an applicant, and system 100 makes a validation determination to determine whether the device owner matches to the responsible party (e.g., account holder). For example, the user can correspond to an applicant that uses the software running on user device 10 to apply for a new account (e.g., credit card account). The new accounts application can identify, for example, a legal name, a home address and/or billing address. The third-party service 20 can identify a device identifier on file that is associated with information provided on the application, and further integrate the device identifier with the inquiry 161 to the system 100.

The user device 10 on which the application was completed can execute processes, such as described with software component 12, to obtain and transmit sensor data from the user device 10 to system 100. For example, an applicant-user can complete an application form using software that is downloaded on user device 10. Once a new application form is completed, processes provided with the software can execute to collect and transmit sensor data 25 (e.g., wireless sensor data, movement sensor data, environmental sensor data, etc.).

Accordingly, the system 100 can receive sensor data 25 from a user device 10 on which a new application form has been submitted (220). The sensor data may be obtained and transmitted to the system 100 repeatedly, such as over the course of multiple days. In some implementations, the sensor data is hashed and stored with data store 130, in association with an existing record 131 for a user that is deemed to be the responsible party for the newly opened account. The user profile determination 140 can implement processes to determine the location-based identifiers for the set of sensor data 125 that is received from user device 10, once the form has been submitted for approval (e.g., during approval period following form submission). Thus, for example, the user profile determination 140 can implement fingerprint logic 136 to determine location fingerprints 133 associated with the retrieved set of sensor data (222). The system 100 can aggregate sufficient amount of sensor data 125 over different time intervals to determine location fingerprints 133 that represent different locations of relevance for the applicant. In some variations, the system 100 can aggregate and analyze sufficient data to identify a location fingerprint 133 for a home of a user of the device 10.

The system 100 can further retrieve location-based identifiers from the record 131 of the responsible party (e.g., based on historical data a record 131 associated with responsible party) (228). As described with other examples, the location-based identifiers can include location fingerprints 133 that correspond to a user's home or other location of relevance (e.g., a location or place with the user frequently visits).

According to examples, the system 100 makes a validation determination as to whether the applicant is the responsible party (230). In an embodiment, the match identifier component 142 can determine whether to validate the applicant as the responsible party by determining whether the location fingerprint 133 determined from recent or current sensor data (e.g., sensor data set 125 obtained during approval period, following submission of the application) match to existing location fingerprint 133 of the record 131 for the responsible party. For example, the match identifier component 142 can determine whether location fingerprints 133 in the recent collection of sensor data 125 from the user device 10 match location identifiers representing the home of the responsible party. As an addition or alternative, the match identifier component 142 can determine whether location fingerprints 133 of the recent collection of sensor data 125 match location identifiers representing locations of interest of the responsible party.

In examples, the validation determination may be in the form of a score 165 that is indicative of a likelihood or probability the responsible party the submitted application. The AVC engine 160 can provide the score 165 to the third party service 20. If the respective location fingerprints 133 are deemed to match, the score or outcome can be communicated to the third-party service 20, to allow the applicant to use or register the account. If the respective location fingerprints 133 are deemed to not match, the score or outcome can be communicated to the third-party service 20, which in turn can decide or implement additional security and validation measures for the application.

With reference to FIG. 2B, system 100 can receive from a third-party service 20 a request to validate a location of a user (250). By way of example, the request can be made in context of validating that the user is present at a location of a merchant. In other examples, the validation determination is to determine the user is in the presence of a valid product code (e.g., QR code) (254). In examples, the input provided to the 160 can include location information that identifies or is otherwise indicative of an environment.

The system 100 can use the provided information to look-up or otherwise obtain an environment signature 155 that corresponds to the location of the merchant or product code (256). The environmental signature can be determined from, for example, a mapping component that associates environmental signatures with environments or locations. In some examples, the environment signature 155 can be identified, by classification or other information, based on sensor data 125 collected from the user device or other devices. Based on the classification or other determination, the presence of the user at a particular environment can be validated.

In examples, environment matching component 162 can trigger retrieval of current sensor data from a corresponding user device 10 (260). The environment profile determination component 150 can further determine an environment signature 155 based on the sensor data collected from the user device 10 (262).

In variations, environment signature 155 can be identified or otherwise determined for the environment of inquiry—meaning the environment where the user's presence is being validated.

The environment signature 155 that is determined from a current collection of sensor data 125 of the user device can be compared with the know environment signature 155 (260). Environment matching component 162 can determine a match score 175 that can reflect the probability of the user device 10 being present at the environment of the inquiry (270). If the third-party service 20 receives a match score 175 that is indicative of the user being present, the third-party service 20 can implement operations to allow, for example, a transaction or other activity to be completed. On the other hand, if the third-party service receives a match score 175 that is indicative of the user not being present at the environment in question, the third-party service 20 can implement operations to decline a transaction or activity, or alternatively, escalate the determination of user presence in the environment in question.

In examples, the environment in question can correspond to a merchant site. In some examples, the environment signature 155 for the environment in question can be determined from identifying a user device 10 of a merchant (or individual who is known or expected to be at the merchant site). For example, the third-party service 20 can provide an identifier of a user device 10 for a merchant at a current time interval. Environment matching component 162 can trigger retrieval of sensor data from the user device 10 of the merchant (or person at the merchant site). Further, environment matching component 162 can implement operations to determine an environment signature 155 for the current sensor data set of the merchant located user device 10. Environment matching component 162 can then compare the environment signature 155 from the user device (or the individual that is being validated as being present at the environment of inquiry) and the environment signature 155 for the merchant located user device 10.

In variations, the environment signature 155 of the merchant site can be determined from the aggregation of sensor data collected other users who were present at the location during a relevant time period (e.g., within the past one or two hours). The environment signature 155 can include sensor data that reflects, for example, output from environmental sensors such as noise level, ambient light, temperature and other factors. For example, the environment in question can be included as part of a virtual map that identifies different environments by environment signatures 155. In such cases, environment matching component 162 can validate the presence of the user device 10 at environment of the merchant by comparing the determined environment signature 155 from current sensor data of user device 10 with environmental signatures determined from the aggregation of different user devices 10.

As another example, the third-party service 20 can provide an inquiry service 161 that identifies the location of a product, such as a product that a user of user device 10 wishes to purchase. The product may be associated with a code (QR code). Further, the code can be pre-associated with a particular environment. At the time of transaction, the third-party service 20 can provide an inquiry to cause environment matching component 162 to collection sensor data from the user device 10, and to determine whether the environment in which the user is deemed to be present in has correlation to an environment that is indicated by the coded product. If correlation exists, the system can validate the QR code is valid (e.g., QR code has not been previously swapped).

FIG. 3 illustrates a method for approximating a position of a user device using multisensory data sets, according to one or more embodiments. A method such as described with FIG. 3 may be implemented using a network computer system 100 such as described by FIG. 1. In variations, a method such as described with an example of FIG. 3 may be implemented by a network computing system that includes distributed functionality as between a centralized computer system and one or more user devices. In describing an example method of FIG. 3, reference may be made to elements of FIG. 1 for purpose of illustrating a suitable step for performing a step or sub-step being described.

With reference to an example of FIG. 3, the system 100 obtains sensor data which includes data generated from movement sensors of the user device 10 (310). The sensor data includes accelerometer readings obtained by movement of user device 10, carried by at least one user between a first and second location. In examples, the user may traverse between two locations by, for example, walking. Further, an area of the user's traversal may have satellite-based location services that fall below an acceptable threshold.

In examples, the system 100 analyzes the accelerometer readings to extract out specific aspects of the collected data (320). The system 100 may extract out accelerometer data generated in connection with multiple walking phases of a user traversing (e.g., walking) from a first location to a second location. The system 100 may process the accelerometer readings to detect and correct, in real-time (or near real-time), a currently measured Z vector, as well as a pitch angle and a roll angle thereof. The pitch and roll angle can compensate for horizontal accelerations, facilitating determination of a Z vector pointing toward Earth's center. From the Z vector (pointing toward earth's center), the system 100 may identify a surface that is parallel to the Earth's face (and perpendicular the said Z vector pointing toward earth's center).

In some examples, the system 100 estimates an offset (330). The determination of the offset may be based on the surface parallel to Earth's face and a magnetic north measured by at least one built-in magnetometer sensor of the user device 10. The office may be selected from a group that includes: an azimuth offset from magnetic north and a heading offset from geometric north.

The system 100 further processes accelerometer information related to the walking phases of the user (or user device) to determine a direction of propagation of the user device (340). The system 100 further corrects the direction of propagation based on said offset (342).

The system 100 estimates at least one location of the user device 10 based at least in part on the corrected direction of propagation (350).

In examples, the system calculates a location fingerprinting map using multisensory data vectors, as determined by the system 100, where the location fingerprint map includes multiple grid points that individually include a multisensory grid point fingerprint and grid point location information derivable from the estimated location (360). In some examples, the multisensory data vectors include location fingerprints. As an addition or alternative, the multisensory data vectors include ambient noise, temperature and/or earth's magnetic field information.

The system 100 can send directional information to the user device 10 (370). In examples, the directional information can be sent automatically, as a response to a location of the user device 10, as well as a target destination and a location fingerprint map.

According to examples, the system 100 may acquire a second multisensory grid point fingerprint, and further estimate at least one navigation system location (380). The system 100 may compare the second multisensory grid point fingerprint to the first multisensory grid point fingerprint. The location of the user device 10 can be estimated from the comparison.

In examples, the system 100 processes location information that is indicative of the path of one or multiple users within, for example, an indoor area (or other region) where satellite positioning systems are unreliable (390). The path information of multiple user devices 10 can be processed to generate an estimated three-dimensional map of the area or region.

Figure 4:
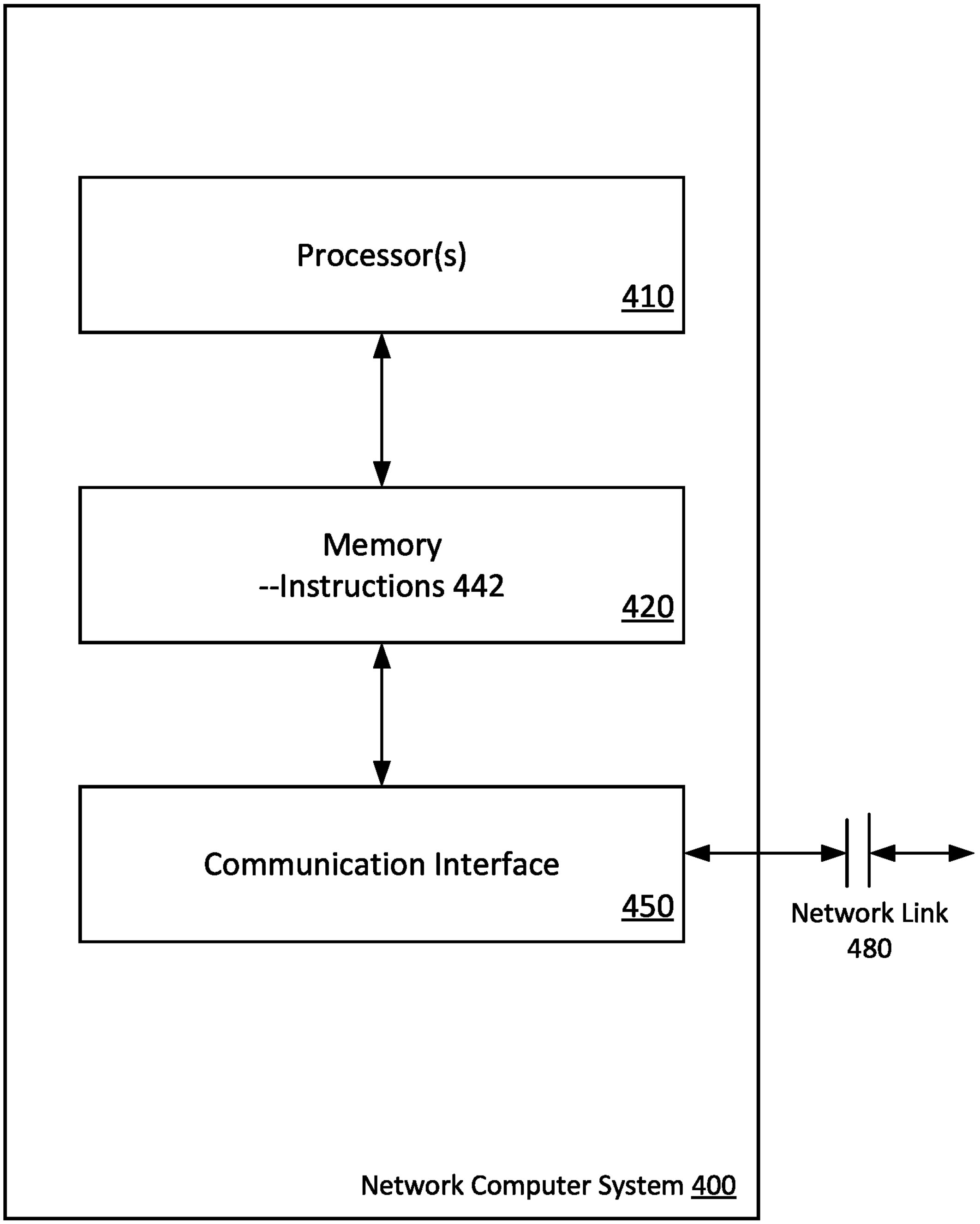
FIG. 4 illustrates a network computer system on which one or more embodiments can be implemented.

FIG. 4 illustrates a network computer system on which one or more embodiments can be implemented. A computer system 400 can be implemented on, for example, a server or combination of servers. For example, the network computer system 400 may be implemented as part of the of system 100, as described with examples of FIG. 1. Likewise, the network computer system 400 can implement a method such as described with examples of FIG. 2A, FIG. 2B and FIG. 3.

In one implementation, the network computer system 400 includes processing resources 410, memory resources 420 (e.g., read-only memory (ROM) or random-access memory (RAM)), and a communication interface 450. The network computer system 400 includes at least one processor 410 for processing information stored in the memory 420, such as provided by a random-access memory (RAM) or other dynamic storage device, for storing information and instructions which are executable by the processor 410. The memory 420 can also be used to store temporary variables or other intermediate information during execution of instructions to be executed by the processor 410. The network computer system 400 may also include the memory resources 420 or other static storage device for storing static information and instructions for the processor 410.

The communication interface 450 enables the network computer system 400 to communicate with one or more networks (e.g., cellular network) through use of the network link 480 (wireless or a wire). Using the network link 480, the computer system 400 can communicate with one or more computing devices, specialized devices and modules, and one or more servers. The executable instructions stored in the memory 420 can include instructions 442, to implement a computer system such as described with examples of FIG. 1. The executable instructions stored in the memory 420 may also implement a method, such as described with one or more examples of FIG. 2A, FIG. 2B and FIG. 3.

As such, examples described herein are related to the use of the network computer system 400 for implementing the techniques described herein. According to an aspect, techniques are performed by the computer system 400 in response to the processor 410 executing one or more sequences of one or more instructions contained in the memory 420. Such instructions may be read into the memory 420 from another machine-readable medium. Execution of the sequences of instructions contained in the memory 420 causes the processor 410 to perform the process steps described herein.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising: one or more processors; one or more memory resources storing instructions; wherein the one or more processors execute the stored instructions to: obtain device data from a user device, the device data including a device identifier of the user device and multiple sets of sensor data of different types; based on the multiple sets of sensor data, determine (i) one or more location fingerprints, each location fingerprint including a vectorized data set that is based on the multiple sets of sensor data of different types and uniquely identifying a corresponding location from where one or more of the multiple sets of sensor data was obtained, and (ii) a location-based behavior that is specific to a user of the user device and associated with at least one of the one or more location fingerprints; determine timing information for each of the one or more location fingerprints, wherein for each of the one or more location fingerprints, the timing information includes a time, frequency, and/or duration in which the user of the user device is located at the corresponding location; determine one or more relevant locations for the user device based on the one or more location fingerprints and the timing information; store the device identifier in association with the one or more location fingerprints or the location-based behavior of the user, and the one or more relevant locations; communicate with the user device to receive multiple sets of current or recent sensor data of different types from the user device; determine, based on the one or more current or recent sets of sensor data, at least one of (i) a current or recent location fingerprint including a corresponding vectorized data set that is based on the multiple sets of current or recent sensor data of different types, and uniquely identifying a corresponding location from where the one or more current or recent sets of sensor data was obtained on the user device, and (ii) a current or recent location-based behavior of the user of the user device in association with the current or recent location fingerprint; validate information about the user of the user device based on a comparison of (a) the at least one of the current or recent location fingerprint or the current or recent location-based behavior in association with the current or recent location fingerprint, and (b) the respective one or more location fingerprints or the location-based behavior that is specific to the user of the user device and associated with at least one of the one or more location fingerprints; wherein validating information about the user includes determining that a current or recent location of the user is one of the one or more relevant locations; and generate an output that is based on the comparison, the output indicating a probability or degree to which the current or recent location fingerprint or location-based behavior data set matches the respective one or more location fingerprints or the location-based behavior that is specific to the user of the user device, wherein the output that is generated indicating a probability or degree to which the current or recent location fingerprint matches the respective one or more location fingerprints is based on at least one type of sensor data of the multiple sets of sensor data that is not positioning sensor data identifying longitude and latitude of the corresponding location, wherein obtaining device data includes using data gathering logic that optimizes the use of sensors and resources of the user device and preserves power used by the user device, the data gathering logic including one or more of (i) determining a schedule under which the user device gathers and transmits sensor data based on a location-specific profile for the user, (ii) determining when gathering sensor data by the user device should be implemented based on a behavior logic that determines an activity being performed by the user and/or (d) determining when gathering sensor data by the user device should be implemented based on a predictive determination as to a next location of the user.

2. The computer system of claim 1, wherein the output includes a risk score.

3. The computer system of claim 1, wherein the one or more processors execute the stored instructions to authenticate the user based on the comparison.

4. The computer system of claim 1, wherein the one or more processors execute the stored instructions to:

receive a request from a requester;

associate a user identifier specified in the request with the device identifier; and wherein the one or more processors communicate with the user device to receive the at least one of the current or recent location fingerprint or the current or recent location-based behavior in response to the request.

5. The computer system of claim 4, wherein the corresponding location identified by at least one of the one or more location fingerprints is labeled as an authorized location for the user of the user device; wherein the one or more processors execute the stored instructions to determine whether the user is located at one of the authorized locations based on the comparison.

6. The computer system of claim 1, wherein each of the one or more current or recent sets of sensor data includes a time stamp as to when the respective sensor data was sampled on the user device; and wherein the comparison is further based at least in part on a time when the user was most recently located at a given location, the time being based on the time stamp as to when recent sensor data of the given location was sampled on the user device.

7. The computer system of claim 1, wherein the one or more processors execute the stored instructions to:

detect an event in which information associated with a user identifier is to be validated;

associate the user identifier with the device identifier; and wherein validating the information about the user includes determining, based on the comparison, a distance or duration of travel.

8. The computer system of claim 1, wherein the one or more processors execute the stored instructions to:

receive a query from a requester, the query identifying an address and a user identifier;

associate the user identifier with the device identifier; and wherein validating information about the user includes determining whether the address is for the relevant location.

9. The computer system of claim 1, wherein the one or more processors execute the stored instructions to: determine one or more trusted locations for the user device based on the one or more location fingerprints and the timing information;

store the device identifier in association with the one or more trusted locations.

10. The computer system of claim 9, wherein the one or more processors execute the stored instructions to:

determine a trusted behavior for the user of the user device, the trusted behavior being stored in association with a location fingerprint of the one or more trusted locations, the trusted behavior being based at least in part on sensor data sampled when the user device is at the trusted location.

11. The computer system of claim 10, wherein the corresponding timing parameter of each trusted location indicates a duration and/or time of day.

12. The computer system of claim 10, wherein the one or more processors execute the stored instructions to:

determine a corresponding timing parameter associated with the current or recent location fingerprint indicating when the current or recent location fingerprint was sampled on the user device; and wherein validating information about the user includes comparing (i) the corresponding location of the current or recent location fingerprint, and the corresponding timing parameter, with (ii) one or more of the trusted locations of the trusted behavior.

13. The computer system of claim 1, wherein the output includes a score that indicates that the user of the user device, at a time when data for the one or more current or recent sets of sensor data is sampled on the user device, is the user associated with the device identifier of the user device.

14. A non-transitory computer readable medium that stores instructions, which when executed by one or more processors of a computer system, cause the computer system to perform operations that include: obtaining device data from a user device, the device data including a device identifier of the user device and multiple sets of sensor data of different types; based on the multiple sets of sensor data, determining at least one of (i) one or more location fingerprints, each location fingerprint including a corresponding vectorized data set that is based on the multiple sets of current or recent sensor data of different types, and uniquely identifying a corresponding location from where one or more of the multiple sets of sensor data was obtained, and (ii) a location-based behavior that is specific to a user of the user device and associated with at least one of the one or more location fingerprints; determine timing information for each of the one or more location fingerprints, wherein for each of the one or more location fingerprints, the timing information including a time, frequency, and/or duration in which the user of the user device is located at the corresponding location; determining one or more relevant locations for the user device based on the one or more location fingerprints and the timing information; storing the device identifier in association with the one or more location-fingerprints or the location-based behavior of the user, and the one or more relevant locations; communicating with the user device to receive multiple sets of current or recent sensor data of different types from the user device; determining, based on the one or more current or recent sets of sensor data, at least one of (i) a current or recent location fingerprint including a corresponding vectorized data set that is based on the multiple sets of current or recent sensor data of different types, and uniquely identifying a corresponding location from where the one or current or recent sets of sensor data was obtained on the user device, and (ii) a current or recent location-based behavior of the user of the user device in association with the current or recent location fingerprint; validating information about the user of the user device based on a comparison of (a) the at least one of the current or recent location fingerprint or the current or recent location-based behavior in association with the current or recent location fingerprint, and (b) the respective one or more location fingerprints or the location-based behavior that is specific to the user of the user device and associated with at least one of the one or more location fingerprints; wherein validating information about the user includes determining that a current or recent location of the user is one of the one or more relevant locations; and generating an output that is based on the comparison, the output indicating a probability or degree to which the current or recent location fingerprint or location-based behavior data set matches the respective one or more location fingerprints or the location-based behavior that is specific to the user of the user device, wherein the output that is generated indicating a probability or degree to which the current or recent location fingerprint matches the respective one or more location fingerprints is based on at least one type of sensor data of the multiple sets of sensor data that is not positioning sensor data identifying longitude and latitude of the corresponding location, wherein obtaining device data includes using data gathering logic that optimizes the use of sensors and resources of the user device and preserves power used by the user device, the data gathering logic including one or more of (i) determining a schedule under which the user device gathers and transmits sensor data based on a location-specific profile for the user, (ii) determining when gathering sensor data by the user device should be implemented based on a behavior logic that determines an activity being performed by the user, and/or (d) determining when gathering sensor data by the user device should be implemented based on a predictive determination as to a next location of the user.

15. The non-transitory computer readable medium of claim 14, wherein the output includes a risk score.

16. The non-transitory computer readable medium of claim 14, wherein the operations include authenticating the user based on the comparison.

17. The non-transitory computer readable medium of claim 14, wherein the operations include:

receiving a query from a requester, the query identifying an address and a user identifier;

associating the user identifier with the device identifier; and wherein validating information about the user includes determining whether the address is for the relevant location.

18. A method for utilizing information obtained from user devices, the method being implemented by one or more processors of a computer system and comprising: obtaining device data from a user device, the device data including a device identifier that identifies of the user device and multiple sets of sensor data of different types; based on the multiple sets of sensor data, determining at least one of (i) one or more location fingerprints, each location fingerprint including a vectorized data set that is based on the multiple sets of sensor data of different types and uniquely identifying a corresponding location from where one or more of the multiple sets of sensor data was obtained, and (ii) a location-based behavior that is specific to a user of the user device and associated with at least one of the one or more location fingerprints; determining timing information for each of the one or more location fingerprints, wherein for each of the one or more location fingerprints, the timing information including a time, frequency, and/or duration in which the user of the user device is located at the corresponding location; determining one or more relevant locations for the user device based on the one or more location fingerprints and the timing information; storing the device identifier in association with the one or more location fingerprints or the location-based behavior of the user, and the one or more relevant locations; communicating with the user device to receive multiple sets of current or recent sensor data of different types from the user device; determining, based on the one or more current or recent sets of sensor data, at least one of (i) a current or recent location fingerprint including a corresponding vectorized data set that is based on the multiple sets of current or recent sensor data of different types, and uniquely identifying a corresponding location from where the one or current or recent sets of sensor data was obtained on the user device, and (ii) a current or recent location-based behavior of the user of the user device in association with the current or recent location fingerprint; validating information about the user of the user device based on a comparison of (a) the at least one of the current or recent location fingerprint or the current or recent location-based behavior in association with the current or recent location fingerprint, and (b) the respective one or more location fingerprints or the location-based behavior that is specific to the user of the user device and associated with at least one of the one or more location fingerprints; wherein validating information about the user includes determining that a current or recent location of the user is one of the one or more relevant locations; and generating an output that is based on the comparison, the output indicating a probability or degree to which the current or recent location fingerprint or location-based behavior data set matches the respective one or more location fingerprints or the location-based behavior that is specific to the user of the user device, wherein the output that is generated indicating a probability or degree to which the current or recent location fingerprint matches the respective one or more location fingerprints is based on at least one type of sensor data of the multiple sets of sensor data that is not positioning sensor data identifying longitude and latitude of the corresponding location, wherein obtaining device data includes using data gathering logic that optimizes the use of sensors and resources of the user device and preserves power used by the user device, the data gathering logic including one or more of (i) determining a schedule under which the user device gathers and transmits sensor data based on a location-specific profile for the user, (ii) determining when gathering sensor data by the user device should be implemented based on a behavior logic that determines an activity being performed by the user, and/or (d) determining when gathering sensor data by the user device should be implemented based on a predictive determination as to a next location of the user.

* * * * *